(12) United States Patent
Ross et al.

(10) Patent No.: US 9,333,957 B2
(45) Date of Patent: May 10, 2016

(54) METHOD FOR OPERATING A BRAKE SYSTEM FOR A MOTOR VEHICLE AND BRAKE SYSTEM

(75) Inventors: Scott Ross, Oberursel (DE); Alexander Schönbohm, Frankfurt (DE); Florian Mathis, Bitburg (DE)

(73) Assignee: Continental Teves AG & Co. oHG (DE)

( * ) Notice: Subject to any disclaimer, the term of this patent is extended or adjusted under 35 U.S.C. 154(b) by 774 days.

(21) Appl. No.: 13/575,392

(22) PCT Filed: Jan. 28, 2011

(86) PCT No.: PCT/EP2011/051257
§ 371 (c)(1),
(2), (4) Date: Jul. 26, 2012

(87) PCT Pub. No.: WO2011/092308
PCT Pub. Date: Aug. 4, 2011

(65) Prior Publication Data
US 2012/0299367 A1 Nov. 29, 2012

(30) Foreign Application Priority Data

Jan. 28, 2010 (DE) .......................... 10 2010 001 312
Feb. 11, 2010 (DE) .......................... 10 2010 001 822

(51) Int. Cl.
*B60T 13/74* (2006.01)
*B60T 8/48* (2006.01)

(52) U.S. Cl.
CPC ......... *B60T 8/4872* (2013.01); *B60T 2270/608* (2013.01)

(58) Field of Classification Search
CPC ................................. B60T 13/14; B60L 3/102
USPC .................................... 303/3, 155, 152, 64, 65
See application file for complete search history.

(56) References Cited

U.S. PATENT DOCUMENTS

| 5,853,229 A | 12/1998 | Willmann et al. |
| 6,412,882 B1 * | 7/2002 | Isono et al. ................. 303/114.1 |

(Continued)

FOREIGN PATENT DOCUMENTS

| DE | 196 04 134 | 8/1997 |
| DE | 101 29 594 | 1/2002 |

(Continued)

OTHER PUBLICATIONS

German Search Report corresponding to German Application No. 10 2011 003 346.7, dated Aug. 19, 2011.
International Search Report corresponding to International Application No. PCT/EP2011/051257, dated Apr. 1, 2011.

*Primary Examiner* — Robert A Siconolfi
*Assistant Examiner* — Mahbubur Rashid
(74) *Attorney, Agent, or Firm* — RatnerPrestia

(57) ABSTRACT

A method in which a brake system for a motor vehicle is controlled and/or regulated. The motor vehicle having at least one electrically regenerative brake and a pressure-medium-operated, in particular a hydraulic brake system with friction brakes, wherein the wheel brakes assigned to the individual wheels are arranged in at least two brake circuits which can be charged with a pressure medium by a first brake pressure generator, in particular a tandem master brake cylinder, and wherein each brake circuit includes at least one pressure accumulator and at least two electronically activatable hydraulic valves. During a braking process with the one or more electrically regenerative brakes, by suitable activation of at least one hydraulic valve, at a point in time, the pressure medium is discharged only into precisely one predetermined pressure accumulator. The invention also relates to a corresponding brake system.

14 Claims, 13 Drawing Sheets

(56) References Cited

U.S. PATENT DOCUMENTS

| | | |
|---|---|---|
| 2002/0011362 A1 | 1/2002 | Toda |
| 2002/0101114 A1* | 8/2002 | Kamiya et al. ............. 303/114.1 |
| 2004/0212245 A1* | 10/2004 | Tsunehara et al. ................ 303/3 |
| 2007/0296264 A1* | 12/2007 | Haupt et al. ...................... 303/3 |
| 2008/0017425 A1* | 1/2008 | Albrichsfeld et al. ....... 180/65.2 |
| 2011/0248559 A1 | 10/2011 | Vollert et al. |

FOREIGN PATENT DOCUMENTS

| | | |
|---|---|---|
| DE | 10 2004 044 599 | 4/2005 |
| DE | 10 2008 054 859 | 7/2010 |
| DE | 10 2010 039 816 | 3/2012 |
| JP | 7-336805 | 12/1995 |
| WO | WO 2004/101308 | 11/2004 |

\* cited by examiner

METHOD FOR OPERATING A BRAKE SYSTEM FOR A MOTOR VEHICLE AND BRAKE SYSTEM

CROSS REFERENCE TO RELATED APPLICATIONS

This application is the U.S. National Phase Application of PCT International Application No. PCT/EP2011/051257, filed Jan. 28, 2011, which claims priority to German Patent Application No. 10 2010 001 312.9, filed Jan. 28, 2010 and German Patent Application No. 10 2010 001 822.8, filed Feb. 11, 2010, the contents of such applications being incorporated by reference herein.

FIELD OF THE INVENTION

The invention relates to a method in which a brake system for a motor vehicle is controlled and/or regulated, said motor vehicle having at least one electrically regenerative brake and a pressure-medium-operated, in particular hydraulic, brake system with friction brakes, wherein wheel brakes assigned to the individual wheels are arranged in at least two brake circuits which can be charged with pressure medium by a first brake pressure generating means, in particular a tandem master brake cylinder, and wherein each brake circuit comprises at least one pressure accumulator and at least two electronically activatable hydraulic valves, such that during a braking process with the one or more electrically regenerative brakes, by activation of at least one hydraulic valve, at a point in time, the pressure medium is discharged only into one predetermined pressure accumulator, and to a brake system of a motor vehicle which has at least one electrically regenerative brake and a pressure-medium-operated, in particular hydraulic brake system with friction brakes, wherein the wheel brakes assigned to the individual wheels are arranged in at least two brake circuits which can be charged with pressure medium by a first brake pressure generating means, in particular a tandem master brake cylinder, and wherein each brake circuit comprises at least one pressure accumulator and electronically activatable hydraulic valves, wherein said brake system comprises an electronic control and regulating unit by which, during a braking process with the one or more electrically regenerative brakes, at least one hydraulic valve is activated such that, at a point in time, a pressure medium is discharged into precisely one, in particular predetermined pressure accumulator.

BACKGROUND OF THE INVENTION

Motor vehicles whose drive and brake systems comprise one or more electric machines are becoming ever more important. Here, the electric machine may often also be used as a drive if a battery of the motor vehicle has stored an adequate amount of electrical energy. It is desirable, for example with regard to the range of an electric drive, for the battery or the batteries of the motor vehicle to be charged not only when the vehicle is at a standstill but rather also during the operation of the motor vehicle. If the electric machine is operated as a generator, then it is possible during the braking of the motor vehicle for electrical energy to be produced and stored in the battery through conversion of the kinetic energy or rotational energy of the axle connected to the electric drive or of the wheels fastened to said axle.

The braking torque built up as a result of the recuperation, that is to say the production (recovery) of electrical energy by the generator, is dependent on the speed of the motor vehicle and the state of charge of the battery. To be able to realize adequate braking deceleration in all situations, brake systems for example for hybrid vehicles, which combine an electric drive and a combustion engine, have additional braking means in addition to the electrically regenerative brake (that is to say the generator). Said additional braking means, which are conventionally realized in two brake circuits as prescribed by law, comprise for example electromechanical, hydraulic and/or electrohydraulic friction brakes.

In particular, the interaction of hydraulic friction brakes and a generator, which is desirable owing to lower system costs and moderate system complexity, presents some technical challenges: for efficient recuperation, the maximum possible braking torque of the generator in the respective driving situation should be utilized. Furthermore, a transition between braking of the motor vehicle through the braking deceleration of the generator and braking of the motor vehicle by means of friction braking should be possible without resulting in abrupt changes in braking deceleration or an unfavorable braking force distribution. Furthermore, a situation must be prevented in which the decoupling of the electrically regenerative braking by the generator from the brake pedal results in an abnormal pedal feel for the driver, such that it is difficult for the driver to discern the braking action attained by him.

DE 196 04 134 A1, which is incorporated by reference, proposes a method and a device for controlling the brake system of vehicles with electric drive, in which, in a first range of driver braking demand, the braking torque is imparted almost exclusively by the regenerative braking, wherein the hydraulically actuable friction brake imparts substantially no braking torque. This is realized in that, in said range of braking demand, the pressure medium which is caused to flow into the wheel brake cylinders as a result of the brake pedal actuation by the driver is, through corresponding control, recirculated into an accumulator chamber.

WO 2004/101308 A1, which is incorporated by reference, discloses a brake system and a method for regulating a brake system of a motor vehicle which has an electrically regenerative brake, in particular a generator, and a number of hydraulic friction brakes driven at least one brake pressure generating means by means of a brake medium, the overall deceleration of which vehicle is composed of deceleration components of the friction brakes and of the electrically regenerative brake. To attain the greatest possible level of braking comfort and acceptable brake feel, brake medium is discharged into a low-pressure accumulator during braking with the electrically regenerative brake. Here, complex regulation takes place in which the hydraulic valves are held in a precisely determined partially open state.

DE102008054859A1, which is incorporated by reference, discloses a method for controlling a brake actuation of a hydraulic vehicle brake system of a motor vehicle which has an electric drive motor which, for braking the motor vehicle, can be operated as a generator, wherein the vehicle brake system has a master brake cylinder which can be operated by muscle force and to which a wheel brake is connected. If, during a brake actuation, the electric drive motor is operated as a generator, then through the opening of the valve, a brake fluid volume is conducted into the hydraulic accumulator and a wheel brake pressure in the wheel brake is thereby reduced. A boost factor of the brake force booster is preferably reduced during a brake actuation with generator operation of the electric drive motor.

A disadvantage of the brake systems described previously lies in the fact that, owing to different friction losses in the two pressure accumulators (as a result of which a piston movement occurs in the event of different pressures) and/or in the thrust rod circuit and in the floating circuit of the tandem master cylinder, a situation may arise in which only the pressure accumulator of one of the two brake circuits is filled. This can lead to an uncomfortable transition ("blending") from substantially electrically regenerative braking to combined braking with generator and friction brake or purely friction braking.

DE102010039816.0, which is incorporated by reference, discloses a method for operating a brake system of a motor vehicle, wherein the brake system comprises an electric generator and a first and a second hydraulic brake circuit with in each case first and second hydraulic service brakes, a tandem master cylinder, a reservoir for brake fluid and a brake pedal. Upon an actuation of the brake pedal by the driver, the available braking force of the generator is determined, and from this an equivalent brake fluid volume is calculated which corresponds to hydraulic braking of the motor vehicle with the same braking force, and the equivalent brake fluid volume from the second brake circuit is conducted into a volume unit connected to the second brake circuit. This ensures a comfortable pedal feel for the driver, but has the disadvantage that the volume unit, which is formed as an additional component, increases the system complexity.

SUMMARY OF THE INVENTION

The present invention aims to improve a brake system of a motor vehicle which comprises an electrically regenerative brake and a hydraulic brake system with a first brake pressure generating means to which are connected hydraulically actuable friction brakes arranged in at least two brake circuits, wherein each brake circuit has at least one pressure accumulator and electrically controllable hydraulic valves. The overall deceleration of the vehicle is composed generally of deceleration components of the friction brakes and of the electrically regenerative brake. It is sought to provide a pedal feel which is comfortable for the driver, and efficient recuperation with the least possible system complexity.

This is achieved according to aspects of the invention by means of a method in which a brake system for a motor vehicle is controlled and/or regulated, said motor vehicle having at least one electrically regenerative brake and a pressure-medium-operated, in particular hydraulic, brake system with friction brakes, wherein wheel brakes assigned to the individual wheels are arranged in at least two brake circuits which can be charged with pressure medium by a first brake pressure generating means, in particular a tandem master brake cylinder, and wherein each brake circuit comprises at least one pressure accumulator and at least two electronically activatable hydraulic valves, such that during a braking process with the one or more electrically regenerative brakes, by activation of at least one hydraulic valve, at a point in time, the pressure medium is discharged only into one predetermined pressure accumulator, and a brake system of a motor vehicle which has at least one electrically regenerative brake and a pressure-medium-operated, in particular hydraulic brake system with friction brakes, wherein the wheel brakes assigned to the individual wheels are arranged in at least two brake circuits which can be charged with pressure medium by a first brake pressure generating means, in particular a tandem master brake cylinder, and wherein each brake circuit comprises at least one pressure accumulator and electronically activatable hydraulic valves, wherein said brake system comprises an electronic control and regulating unit by which, during a braking process with the one or more electrically regenerative brakes, at least one hydraulic valve is activated such that, at a point in time, a pressure medium is discharged into precisely one, in particular predetermined pressure accumulator.

A method is thus provided in which a brake system for a motor vehicle is controlled and/or regulated, said motor vehicle having at least one electrically regenerative brake and a pressure-medium-operated, in particular hydraulic, brake system with friction brakes, wherein the wheel brakes assigned to the individual wheels are arranged in at least two brake circuits which can be charged with pressure medium by a first brake pressure generating means, in particular a tandem master brake cylinder, and wherein each brake circuit comprises at least one pressure accumulator and at least two electronically activatable hydraulic valves. According to aspects of the invention, during a braking process with the one or more electrically regenerative brakes, by means of suitable activation of at least one hydraulic valve, at a point in time, pressure medium is discharged only into precisely one predetermined pressure accumulator.

As a result of the discharging of the brake medium into a pressure accumulator, virtually purely electrically regenerative braking takes place in the event of a light brake pedal actuation by the driver, as a result of which efficient recuperation and (as a result of the "brake medium consumption" which corresponds to that of a friction braking process) a pedal feel which is comfortable for the driver are ensured. It is advantageously ensured, by means of the discharging of the brake medium only into precisely one pressure accumulator, that said pressure accumulator is filled with a defined volume of brake medium. A predetermined selection of the precisely one pressure accumulator makes it possible, for example, during successive braking processes, for the number of actuations to be distributed in a suitable manner between the pressure accumulators of the two brake circuits, as a result of which a long service life of the brake system can be attained.

The hydraulic valves, in particular the inlet and outlet valves of the wheel brakes, in the two brake circuits are expediently activated such that firstly the pressure accumulator of one brake circuit and subsequently the pressure accumulator of the other brake circuit is filled. Therefore, through suitable selection of the valve opening times, defined filling of the two pressure accumulators is attained without the need for complex analog control of the valves. Said known quantity of brake medium can then be used later for the "blending", that is to say a smooth transition between braking of the motor vehicle by means of the braking deceleration of the generator and braking of the motor vehicle by means of friction braking.

A filling of a pressure accumulator is preferably carried out via the outlet valve of only one of the wheel brakes of the brake circuit. This reduces the number of actuations of the outlet valve and extends the service life of the brake system. It is particularly preferable for a filling of a pressure accumulator, in particular the filling of the pressure accumulator which is filled first, to be carried out via the outlet valve of the front wheel brake of the corresponding brake circuit.

It is advantageous for one of the two wheel brakes of at least one brake circuit to be charged with a predefined pressure medium volume, and for said wheel brake to subsequently be hydraulically isolated, in particular through the closure of the associated inlet valve, from the first brake pressure generating means and in particular from the associated pressure accumulator. As a result of the wheel brake being isolated from the brake pressure generating means, the deceleration imparted by the friction brakes is reduced, as a result of which the electrical energy generated by the generator is maximized. Through suitable selection of the brake medium quantity supplied before the isolation takes place, an unpleasant feedback to the brake pedal when the wheel brake is reconnected to the brake pressure generating means is prevented.

To limit the pressure in one of the wheel brakes, the inlet valve (valve which is open when de-energized) of the wheel brake in question is advantageously closed after a predefined quantity of brake medium in the wheel brake is reached, but before a significant pressure in the wheel brake is reached. Said pre-filling process is advantageous for keeping the pedal feel in a comfortable range, because in this way the brake medium volume which is displaced after the opening of the valve which is open when de-energized is limited. As a result of the closure of the valve which is open when de-energized, a (further) pressure build-up in the corresponding wheel brake caused by the filling of a pressure accumulator (in particular via the outlet valve of the other wheel brake of the same brake circuit) is prevented. In this way, the braking action of the wheel brake on the vehicle is reduced, and therefore the efficiency of the energy production is increased (lower friction losses at said brake).

It is particularly advantageous for the wheel brake to be hydraulically isolated when a first predefined measure of an actuation of a brake actuation pedal is attained. The first predefined measure is detected in particular by means of a pedal angle sensor and/or a suitably located switch. The corresponding signal is simple to evaluate, and therefore simple control of the brake system is advantageously made possible.

It is very particularly preferable for firstly a filling of a pressure accumulator to be commenced via the outlet valve of one of the two wheel brakes, and for a wheel brake of a brake circuit to be hydraulically isolated when the first predefined measure of the brake actuation is attained. It is thus possible for the wheel brake to be isolated only when the brake lining has travelled through the air play, that is to say for example the spacing which exists between the brake disc and brake lining in the rest state of a disc brake, and upon the onset of a first, low braking action. In this way, the brake medium quantity supplied before the isolation takes place can be selected such that an unpleasant feedback to the brake pedal is prevented without the discharge of brake medium into the pressure accumulator being hindered.

It is expedient for the filling of one pressure accumulator to be ended and the filling of the other pressure accumulator to be commenced when a second predefined measure of an actuation of a brake actuation pedal is attained, wherein the second predefined measure is detected in particular by means of a pedal angle sensor and corresponds to a predefined value of the braking torque provided by the electrically regenerative brake or brakes, in particular to a predefined fraction of a maximum delivered braking torque of the electrically regenerative brake or brakes. Control of the brake medium on the basis of such a signal is simple to realize. It is thereby possible for the suitable filling of the two pressure accumulators to be apportioned as a function of the distribution of the brake circuits, such that for example in the case of a diagonal distribution of the brake circuits, both pressure accumulators are filled uniformly.

In a preferred embodiment of the invention, the filling of the pressure accumulators is ended and the hitherto isolated wheel brake is connected to the first brake pressure generating means again when a third predefined measure of an actuation of a brake actuation pedal is attained, wherein the third predefined measure is detected in particular by means of a pedal angle sensor and corresponds to a predefined value of the braking torque provided by the electrically regenerative brake or brakes, in particular to a predefined fraction of a maximum delivered braking torque of the electrically regenerative brake or brakes. If the braking deceleration demanded by the driver exceeds the maximum deceleration provided by the generator, the hitherto isolated wheel brake is connected to the first brake pressure generating means again, whereby the deficiency in deceleration is made up by friction braking. In a particularly preferred embodiment of the invention, said connection of the hitherto isolated wheel brake to the first brake pressure generating means takes place only when the braking deceleration demanded by the driver exceeds the maximum deceleration provided by the generator by a predefined threshold value, in particular 0.05 g. Said opening of the inlet valve of the isolated wheel brake may be necessary owing to a high deceleration demand or owing to a generator deceleration which decreases at low speeds.

In an alternative preferred embodiment of the invention, the filling of the pressure accumulator is ended and the hitherto isolated wheel brake is connected to the first brake pressure generating means again when the difference between the pressure measured at a position of the first brake circuit and the pressure measured at a position of the second brake circuit exceeds a predefined threshold value. An excessively uneven distribution of the pressure in the two wheel brake circuits, with possible unpleasant repercussions on the braking behavior, is thus prevented.

It is preferably provided that, in particular if the braking torque delivered by the electrically regenerative brake or brakes is lower than the braking torque demanded by the driver, the first brake pressure generating means is hydraulically isolated from the wheel brakes in particular through the closure of a hydraulic valve, and that brake medium is delivered from both pressure accumulators into the wheel brakes by means of a second brake pressure generating means, in particular a hydraulic pump. Said active build-up of additional brake pressure may take place in addition to or instead of an opening of the inlet valve of the isolated wheel brake owing to a high deceleration demand or owing to a generator deceleration which decreases at low speeds.

It is particularly advantageous for the actuation of the hydraulic valves of a brake circuit to take place in an alternating fashion, in particular, during one braking process, a first inlet valve is closed and a first outlet valve is opened while a second inlet valve remains open and a second outlet valve remains closed, and in the subsequent braking process, the second inlet valve is closed and the second outlet valve is opened, while the first inlet valve and outlet valve are not actuated. The actuations of the hydraulic valves are thus distributed as uniformly as possible, which increases the service life of the brake system.

The invention relates likewise to a brake system of a motor vehicle which has at least one electrically regenerative brake and a pressure-medium-operated, in particular hydraulic brake system with friction brakes, wherein the wheel brakes assigned to the individual wheels are arranged in at least two brake circuits which can be charged with pressure medium by a first brake pressure generating means, in particular a tandem master brake cylinder, and wherein each brake circuit comprises at least one pressure accumulator and electronically activatable hydraulic valves, and wherein the brake system comprises an electronic control and regulating unit by means of which, during a braking process with the one or more electrically regenerative brakes, at least one hydraulic valve is activated such that, at a point in time, pressure medium is discharged into precisely one, in particular predetermined pressure accumulator.

The brake system expediently has at least one second brake pressure generating means, in particular a hydraulic pump, by means of which brake medium can be delivered out of a pressure accumulator into one or more wheel brakes.

It is particularly preferable if, in each brake circuit, a pressure sensor is attached to at least one wheel brake.

Pressure medium is expediently discharged into the one or more pressure accumulators which are also used for the build-up of pressure for example during a brake slip regulation phase.

In a preferred embodiment of the invention, the first brake circuit is assigned to the front axle and the second brake circuit is assigned to the rear axle of the motor vehicle.

In an alternative preferred embodiment of the invention, the first brake circuit is assigned to one wheel of the front axle and one wheel of the rear axle, and the second brake circuit is assigned to the other wheel of the front axle and the other wheel of the rear axle. This is very particularly preferably a diagonal distribution of the brake circuits, that is to say one front wheel and one diagonally opposite rear wheel are combined in a brake circuit.

It is expedient for the amount of brake medium discharged into the pressure accumulators to be adapted in accordance with the distribution of the brake circuits. For diagonally distributed brake circuits, it is particularly expedient for the pressure accumulators to each receive the same amount of brake medium. It is particularly expedient for the pressure accumulator of a brake circuit assigned to the front axle to store a larger amount of brake medium than the pressure accumulator of a brake circuit assigned to the rear axle, wherein the ratio should be in particular 80:20.

Braking is preferably imparted only by means of friction brakes if the motor vehicle falls below a predefined minimum speed. At speeds below for example 10 km/h, the deceleration imparted by the generator decreases significantly.

It is advantageous for braking to be imparted only by means of friction brakes if the demanded deceleration exceeds a predefined threshold. In this way, the risk posed to driving stability as a result of an unfavorable brake force distribution is eliminated, and the intervention of a brake slip regulation means is facilitated.

If each brake circuit is assigned one front wheel brake and the opposite rear wheel brake, the filling of one pressure accumulator, in particular the filling of the pressure accumulator which is filled first, expediently takes place via the outlet valve of the front wheel brake of the corresponding brake circuit. In this case, it is particularly expedient if, in the brake circuit whose pressure accumulator is not filled first, the front wheel brake is charged with a predefined pressure medium volume and said wheel brake is subsequently hydraulically isolated from the first brake pressure generating means through closure of the associated inlet valve.

The brake pedal preferably has a pedal actuation sensor, for example in the form of a pedal travel transducer or pedal angle transducer. Alternatively or in addition, the brake system preferably has a pressure sensor which is arranged in a brake line leading to the brake pressure generating means (for example master cylinder). A determination of the actuation and/or the degree of actuation of the brake pedal may take place on the basis of the pedal actuation sensor and/or the pressure sensor. The signal of the pedal actuation sensor and/or pressure sensor is preferably taken into consideration for the control or regulation of the brake system.

In a preferred embodiment of the invention, a plausibility check of the signals of the pedal actuation sensor is carried out on the basis of a measurement of the position of the first brake pressure generating means, said position being measured in particular by means of an inductive sensor. In an alternative preferred embodiment of the invention, reliable identification of the driver demand is ensured by virtue of an additional switch being mounted at a suitable position, said switch being fastened to the pedal or to a piston of the tandem master cylinder and being activated at a certain position of the brake pedal. In a further alternative embodiment of the invention, a plausibility check of the data of the pedal angle sensor is carried out by virtue of it being checked whether the pressure in the first brake pressure generating means and/or the amount of brake medium in one of the pressure accumulators exceeds a value corresponding to the corresponding pedal position.

The limitation of the pressure in one wheel brake or the ending of the filling of one wheel brake is carried out when the measure of the pedal actuation has reached a first predefined threshold value.

To simulate exactly the corresponding braking behavior that would arise during friction braking, there is advantageously discharged into the one or more pressure accumulators precisely that pressure medium volume of brake medium that would be accommodated by the friction brakes if the braking torque imparted by an electrically regenerative brake were imparted solely by hydraulic friction braking.

To be able to discharge pressure medium into the pressure accumulator in as simple a manner as possible via a hydraulic valve (valve which is closed when de-energized), the pressure accumulator is expediently configured as a low-pressure accumulator in relation to the hydraulic system of the brake system. Owing to the pressure difference, it is necessary merely for a hydraulic valve to be opened in order to discharge pressure medium into the pressure accumulator.

Each of the pressure accumulators is advantageously connected at the outlet side to a second brake pressure generating means (for example a motor-pump assembly). In the event of a redistribution of braking torque from electrically regenerative brake to the friction brakes, the pressure volume of braking medium required for this purpose is delivered from the pressure accumulator into the corresponding hydraulic lines of the friction brakes by the second pressure generating means. An influence on the first brake pressure generating means is expediently prevented by virtue of said first brake pressure generating means being isolated from the wheel brakes by means of hydraulic valves.

To be able to realize the intended pressure generating processes with the brake pressure generating means, it is expedient for the first brake pressure generating means to be a master brake cylinder operated with or without auxiliary force, in particular a tandem master cylinder, and for the second pressure generating means to be an electrically activatable hydraulic pump, in particular piston pump.

The brake system preferably comprises an electronic control unit which evaluates the available information, for example from the pedal actuation sensor and/or the pressure sensor and/or the generator torque, and activates the hydraulic valves and if appropriate the second pressure generating means accordingly.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
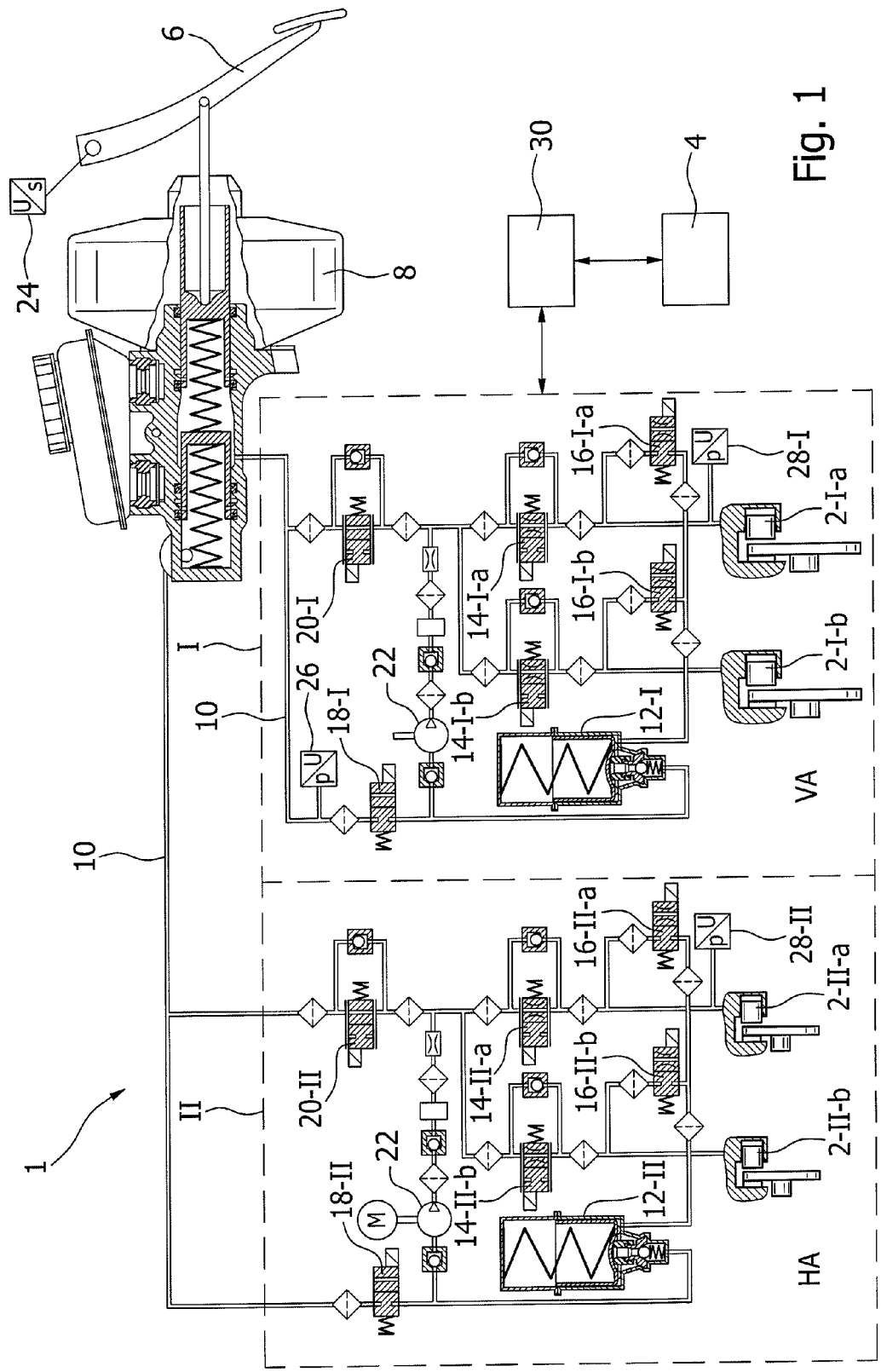
FIG. 1 shows a brake system according to aspects of the invention in the rest state.

FIG. 1 shows a diagrammatic circuit diagram of a brake system 1 for a motor vehicle, said brake system being suitable for carrying out the method according to aspects of the invention. The driver of the motor vehicle inputs the deceleration demand by means of the brake pedal 6. To build up a braking torque by means of the friction brakes 2, the brake system 1 is provided with a first brake pressure generating means which is configured as a tandem master brake cylinder 8 with auxiliary force. Here, the brake pressure imparted by the tandem master brake cylinder 8 is transmitted by a brake medium B via hydraulic lines 10 to the wheel brakes 2. The exemplary brake system comprises two brake circuits I, II, wherein in each case two wheel brakes 2-I-a, 2-I-b and 2-II-a, 2-II-b of the vehicle are combined in a brake circuit I and II respectively. In the example, the first brake circuit I is connected to the wheel brakes 2-I-a, 2-I-b of the front axle VA, and the wheel brakes 2-II-a, 2-II-b of the rear axle HA are connected to the second brake circuit II. The method according to aspects of the invention may however also be carried out, with the same steps, in a brake system with diagonal brake force distribution and/or with a tandem master cylinder 8 without auxiliary force.

Since it is the case in the example illustrated in FIG. 1 that the two brake circuits I, II are hydraulically of substantially identical construction, only the hydraulic components of the first brake circuit I will be described below. A brake line leading from the master brake cylinder 8 branches, downstream of an isolating valve 20-I which is open when de-energized, into two brake lines which lead to the wheel brakes 2-I-a, 2-I-b of the front axle VA and in which is provided in each case one inlet valve 14-I-a, 14-I-b which is open when de-energized—that is to say without electrical activation. Between each inlet valve (valve which is open when de-energized) 14-I-a, 14-I-b and the corresponding wheel brake 2-I-a, 2-I-b, there extends from the respective brake line in each case one return line in which is arranged an outlet valve 16-I-a, 16-I-b which is closed when de-energized. The two return lines are connected via a common brake line piece to a pressure accumulator 12-I. Brake circuit I has a high-pressure-generating pump (motor-pump assembly) 22 (second brake pressure generating means) which is driven by an electric drive motor. Said pump is connected at the suction side to the pressure accumulator 12-I. At the outlet side, the pump 22 is connected to the brake line between the isolating valve 20-I and the inlet valves 14-I. Between the pressure accumulator 12-I and the pump 22, a further brake line leads via an electronic switching valve 18-I, which is closed when de-energized, to the brake line between the master brake cylinder 8 and isolating valve 20-I.

The brake system 1 is a regenerative brake system which, in addition to the hydraulically actuated friction brakes 2, also has an electric machine 4 which can be operated as a generator for the generation of electrical energy. The degree of brake pedal actuation is detected by means of a travel transducer 24 arranged on the brake pedal 6. In principle, use may however also be made of other sensors which provide a signal proportional to the brake actuation by the driver. Furthermore, a pressure sensor 26 is provided which is situated on that hydraulic line 10 of the brake circuit I which leads to the tandem master cylinder 8, which pressure sensor determines the admission pressure. In a preferred embodiment of the invention, the brake medium pressure at the friction brakes 2 is determined by means of pressure sensors 28-I, 28-II which are arranged in each case in a hydraulic line of a wheel brake 2-I-a, 2-II-a. In an alternative preferred embodiment of the invention, the pressure in the wheel brakes is estimated by means of a model known per se.

For the control and/or regulation of the brake system 1, the latter comprises an electronic regulating unit 30 which activates the electronically controllable hydraulic valves 14, 16, 18, and the pump 22. To realize as comfortable as possible a brake feel for the driver via the brake pedal 6, it is possible during the operation of the generator 4 for brake medium B to be discharged into the two pressure accumulators 12 (low-pressure accumulator). Pressure medium B present in the pressure accumulators 12 can be delivered into the wheel brakes 2 by means of the pump 22, as a result of which an additional braking torque is built up in the wheel brakes.

Figure 2:
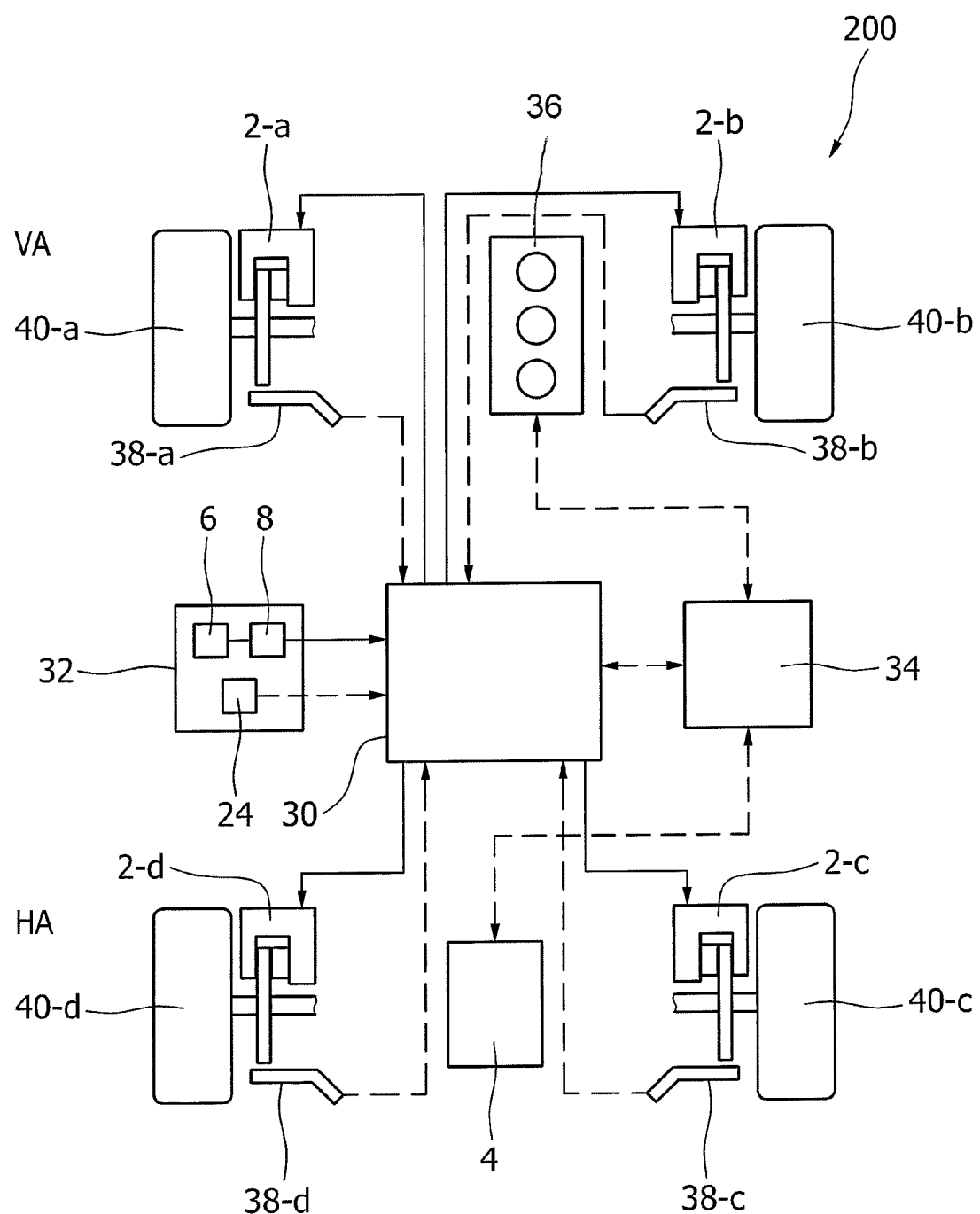
FIG. 2 shows a schematic illustration of a motor vehicle.

FIG. 2 shows a motor vehicle 200 which has a brake system 1 suitable for carrying out the method according to aspects of the invention. The exemplary motor vehicle is a hybrid vehicle which has an internal combustion engine 36 and one or more electric drive motors 4 which can be operated as generators for charging the battery in order to charge one or more vehicle batteries (not shown). Here, for the control of the electric drive, a motor control unit 34 is provided which is connected to the electronic control unit 30 which controls the hydraulic brake system. In the example shown, the electrically regenerative brake 4 acts on the rear axle HA of the vehicle. For the method according to aspects of the invention, it is however in principle irrelevant which wheels 40-a, 40-b, 40-c, 40-d are braked regeneratively in addition to the friction brakes 2-a, 2-b, 2-c, 2-d. The method steps described below are in principle independent of this.

A braking demand of the driver is detected by means of a brake actuation unit 32 which comprises a brake pedal 6, a first brake pressure generating means 8, in particular a tandem master brake cylinder, and a pedal travel or pedal angle sensor 24. Said brake actuation unit conducts brake medium (illustrated as a solid line) and transmits electrical signals (illustrated as a dashed line) to the electronic control unit 30. The vehicle has wheel speed sensors 38-a, 38-b, 38-c, 38-d which transmit their signals likewise to the electronic control unit 30, as a result of which for example slip regulation of the brake pressure in the individual wheel brakes 2-a, 2-b, 2-c, 2-d can be realized.

The electronic control unit 30 and motor control unit 34 exchange information required for electrically regenerative braking, such as the present vehicle speed and the presently available generator deceleration. Here, during a braking process, a demand for braking deceleration to be imparted by the generator is possible. In an alternative embodiment, a motor vehicle suitable for carrying out the method according to aspects of the invention has an electric vacuum pump which supplies a vacuum to a negative pressure brake force booster in order to operate the tandem master brake cylinder 8 with auxiliary force.

Figure 3:
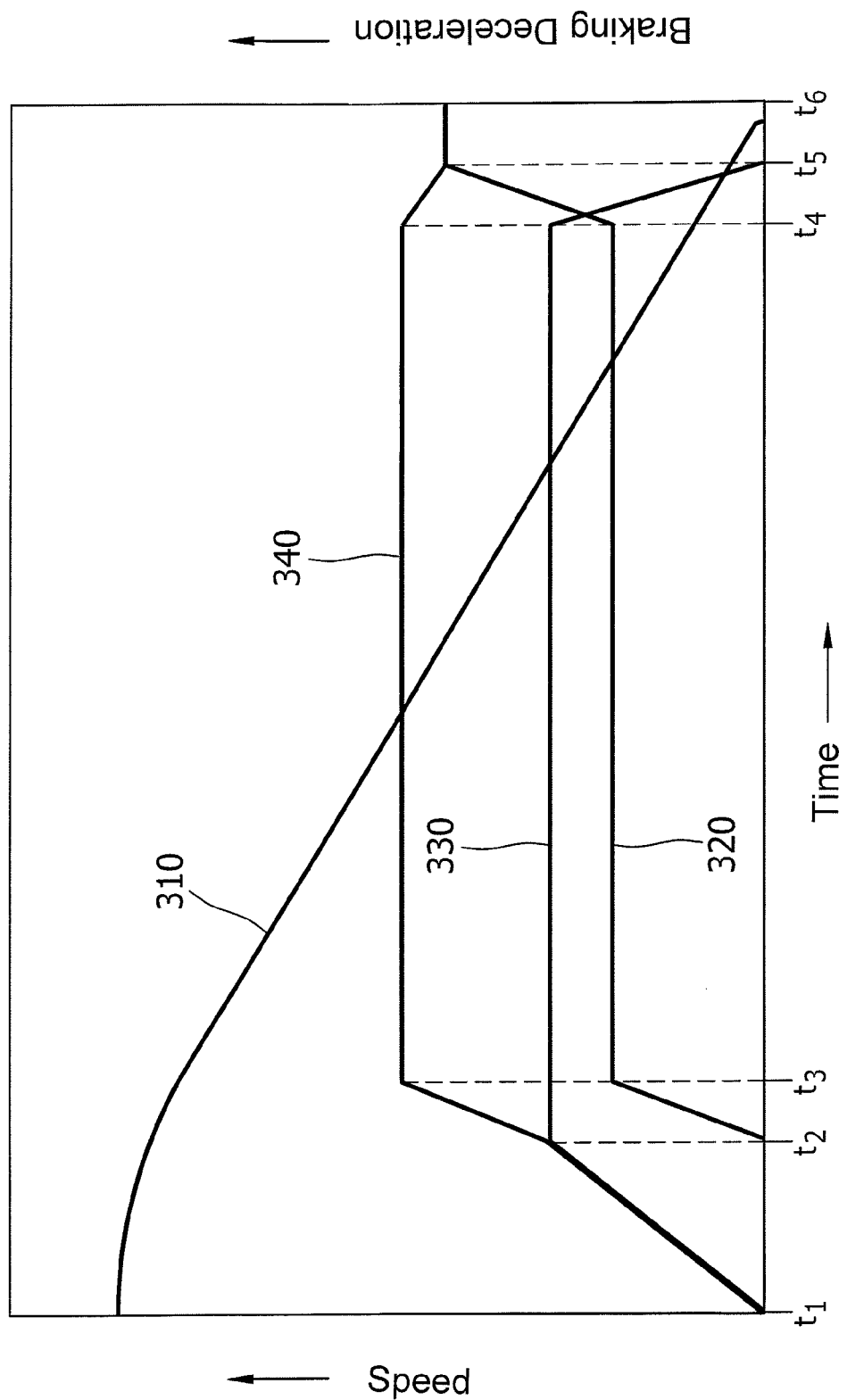
FIG. 3 shows the profile over time of an exemplary braking process of the brake system of FIG. 1, FIGS. 4-8 show method steps of an exemplary method of the brake system of FIG. 1, FIGS. 9-13 show further method steps of an exemplary method of the brake system of FIG. 1.

The course of an exemplary braking process is shown in FIG. 3. The time is plotted on the abscissa, and the ordinate indicates the speed of the motor vehicle and the present braking deceleration respectively. The vehicle speed is illustrated as a line 310, the braking deceleration imparted by the generator is illustrated as a line 330, and the braking deceleration imparted by friction braking is illustrated as a line 320. The line 340 indicates the resulting overall deceleration. During the course of the braking process, which begins at the time $t_1$ and ends at the time $t_6$, the vehicle is braked to a standstill. Here, deceleration of the vehicle is imparted initially only by the electrically regenerative brake. For this purpose, between $t_1$ and $t_2$, the pressure medium of the friction brakes is discharged into pressure accumulators. The more detailed steps will be explained further below on the basis of FIGS. 4 to 8. At the time $t_2$, the filling of the pressure accumulator is ended and the hitherto isolated wheel brake is connected to the tandem master cylinder again. Up to the time $t_3$, the driver presses more intensely on the brake pedal, and subsequently holds the pedal position. The additionally demanded deceleration is provided here by the friction brakes, while the generator braking deceleration remains constant. At the time $t_4$, the speed of the vehicle has fallen to such an extent that the generator deceleration decreases. Therefore, between $t_4$ and $t_5$, a blending process takes place in which additional brake pressure is built up and the electrically regenerative deceleration is reduced in a continuous fashion ("ramp-out"). The more detailed steps will be explained further below on the basis of FIGS. 9-13. At the time $t_6$, the vehicle has come to a standstill.

FIGS. 4-8 schematically illustrate the individual steps of an activation of the hydraulic components during the execution of an exemplary method for filling the pressure accumulator.

FIG. 1 shows, as already described above, the rest state of the brake system 1, that is to say the state without electrical activation of the hydraulic components before the driver has actuated the brake pedal 6. The valves 14, 16, 18, 20 of the two brake circuits I, II are in their de-energized basic position, the pressure accumulators 12 of the two brake circuits I, II are not filled, and the wheel brakes 2 are not actuated.

Figure 4:
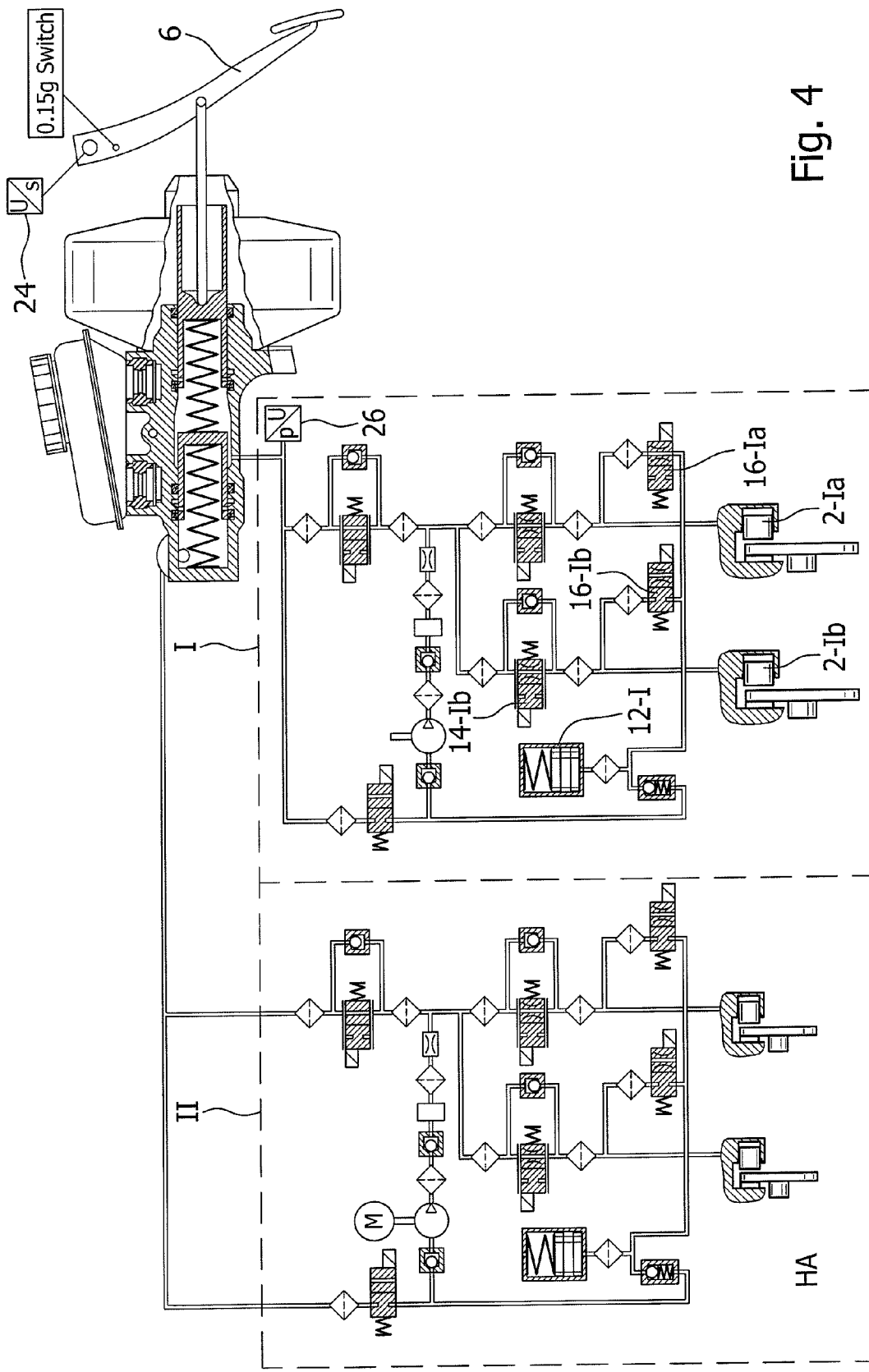

When the driver actuates the brake pedal 6, a regenerative braking operation commences and the valve 16-Ia, which is closed when de-energized, of (only) one wheel brake 2-Ia is activated so as to open as illustrated in FIG. 4. Pressure medium B is thus discharged via said one valve 16-Ia, which is closed when de-energized, into the pressure accumulator 12-I, and the pressure accumulator 12-I of the associated brake circuit I starts to fill up. The operation of a friction brake is simulated by the discharging of brake medium. The brake pedal 6 deflects correspondingly to the discharged pressure medium volume, so as to yield a comfortable brake feel which corresponds to the driving situation.

Figure 5:
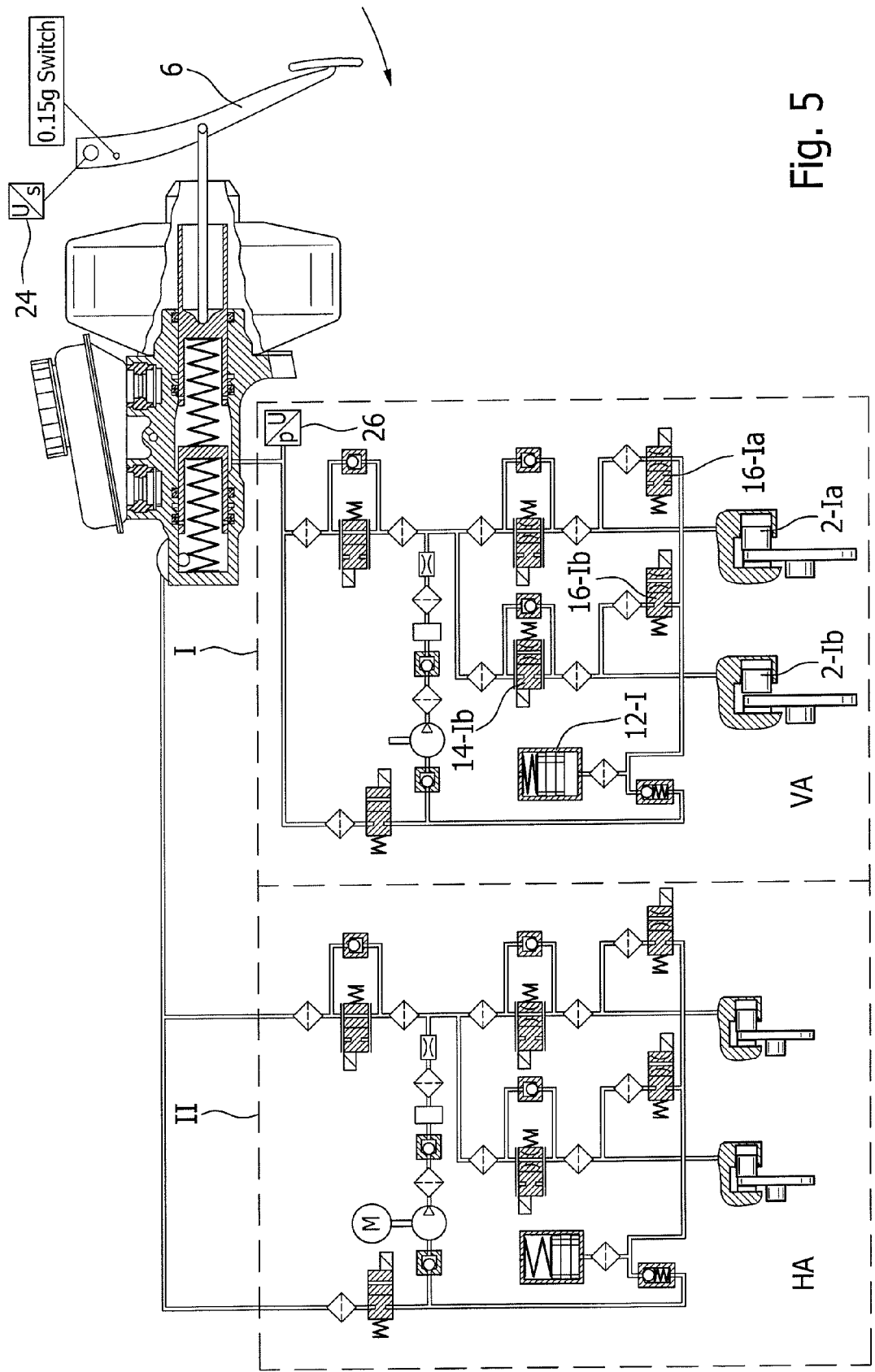

The other wheel brake 2-Ib of the brake circuit I is filled because the associated valve 16-Ib, which is closed when de-energized, remains closed. If a predefined degree of actuation of the brake pedal 6, for example in the form of a predefined pre-filling travel of the brake pedal 6 (measured by a sensor 24) or a predefined pressure at the pressure sensor 26, is reached, the valve 14-Ib, which is open when de-energized, of the wheel brake 2-Ib is closed. As a result, the pressure in the wheel brake 2-Ib is limited to a low level. The wheel brake 2-Ib is thus charged with a predefined (small) pre-filling volume, wherein in the example, the brake linings of the wheel brake 2-Ib just or scarcely bear against the brake disk. During further actuation of the brake pedal 6 via valve 16-Ia, which is closed when de-energized, the pressure accumulator 12-I of the brake circuit I is filled again. Wheel brake 2-Ia is actuated in accordance with the pressure in the pressure accumulator 12-I. This state is illustrated in FIG. 5.

The limited pre-filling volume in wheel brake 2-Ib keeps the braking action at that wheel low and thus increases the (energy) efficiency of the recuperation, but without imparting disturbing effects to the brake pedal 6 when the valve 14-Ib, which is open when de-energized, is (later) opened again (in contrast to the situation if wheel brake 2-Ib were not filled at all), for example in the event of further brake actuation by the driver or in the event of "blending".

Figure 6:
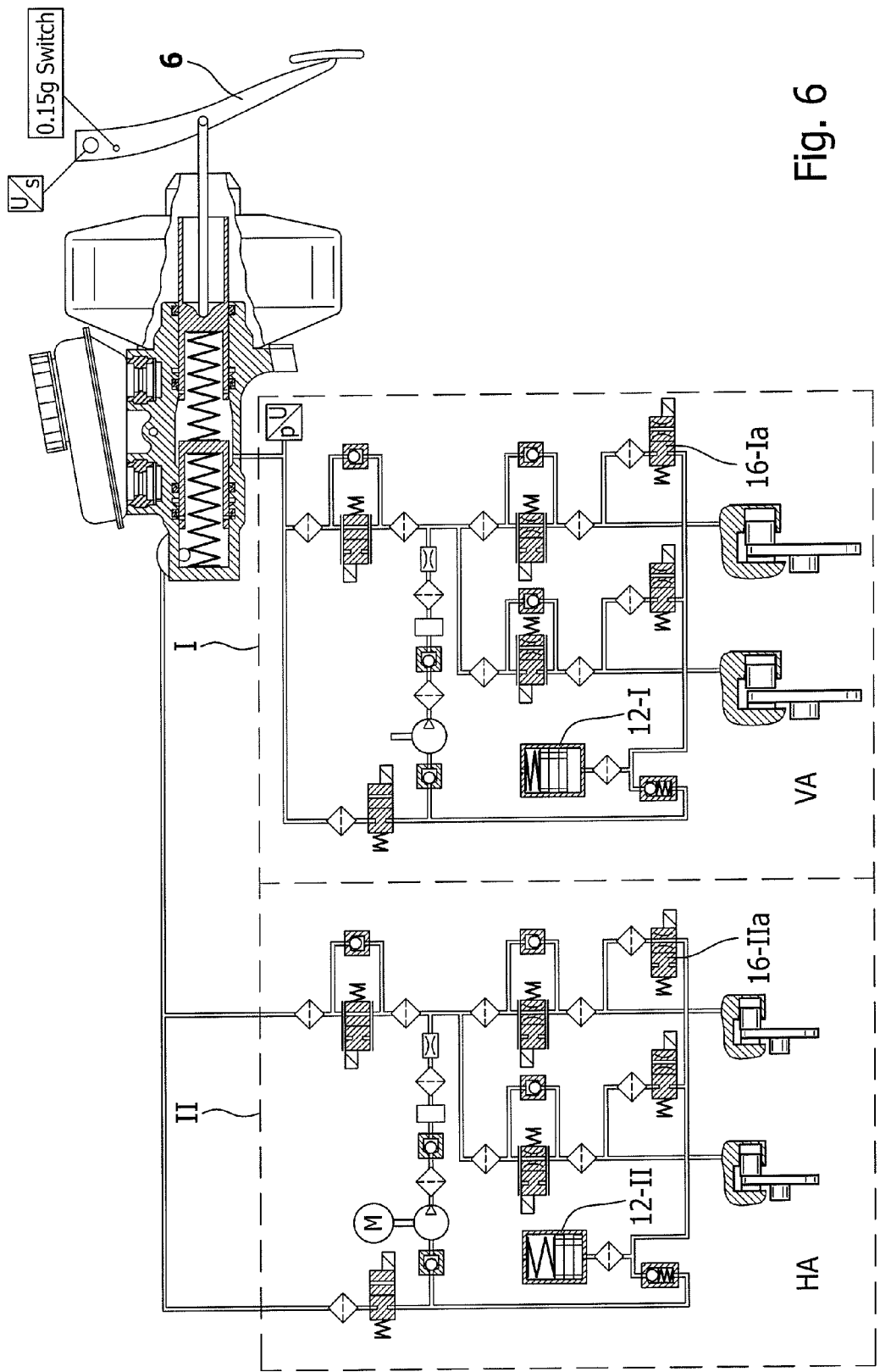
Figure 7:
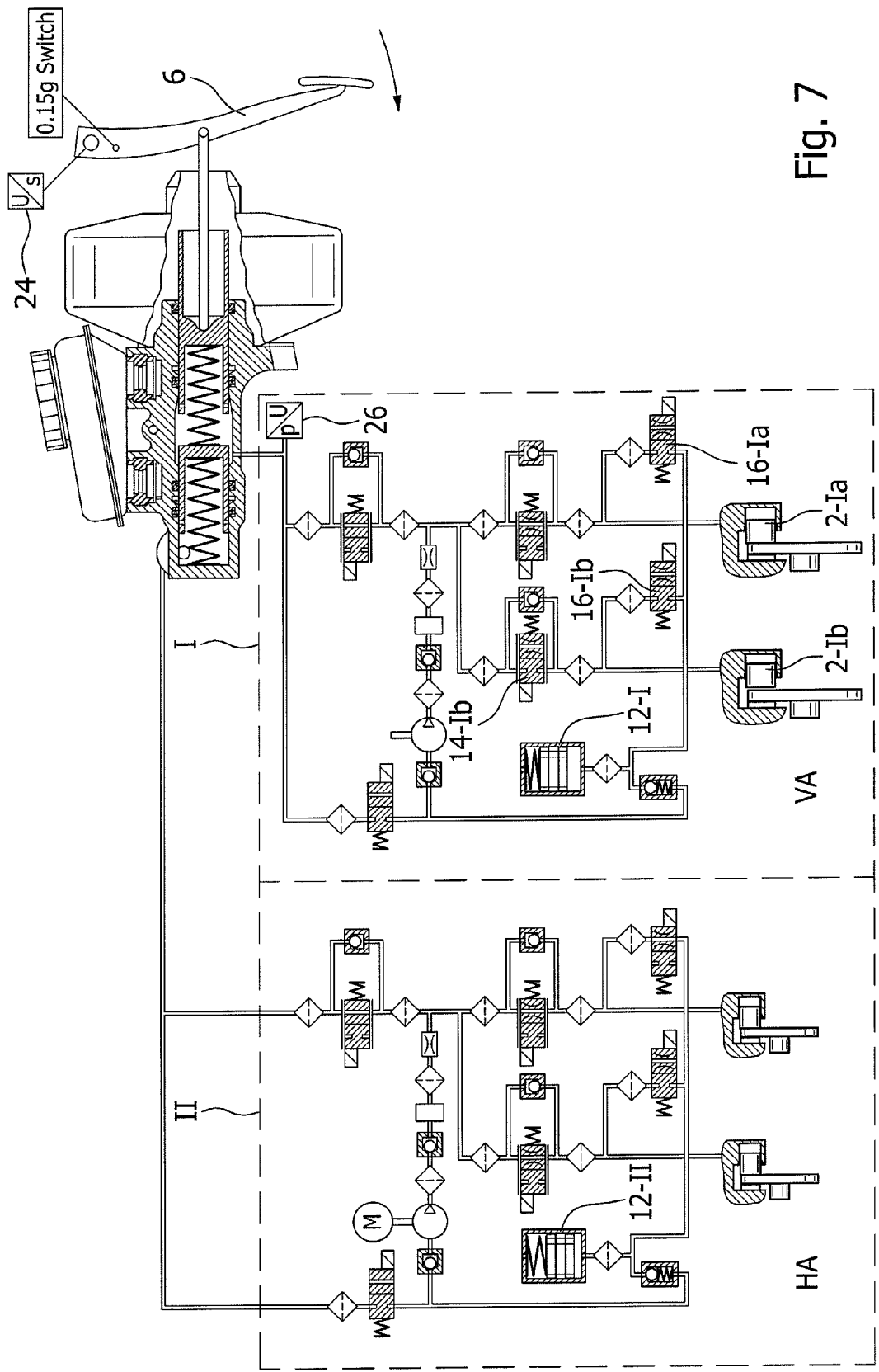

If the braking torque provided by the generator corresponds to the maximum torque that can be delivered by the generator (maximum attainable regenerative deceleration), valve 16-Ia, which is closed when de-energized, is closed, and one of the valves, which is closed when de-energized, of the other brake circuit II is opened, as illustrated in FIG. 6 in the case of 16-II-a. As a result, the filling of the pressure accumulator 12-I is ended and, in the event of further brake actuation, the pressure accumulator 12-II is filled, as illustrated in FIG. 7. It is the aim for both pressure accumulators 12-I and 12-II to be filled adequately with brake medium B such that, later, uniform blending is possible at all four wheel brakes 2, and in the process to limit the brake medium volume in the brake circuit II so as to prevent excessively intense braking at the associated wheel brakes 2-II. This is important in particular if, as in the illustrated example, a front axle/rear axle brake force distribution is provided. Here, the brake medium volume in the rear axle HA should be limited such that the rear axle HA is not overbraked as a result of excessive filling of the rear axle wheel brakes. Corresponding brake medium volumes in the front axle and rear axle result (owing to the conventional different configuration of front axle and rear axle brakes) in a greater pressure rise in the rear axle brakes than at the front axle brakes.

Figure 8:
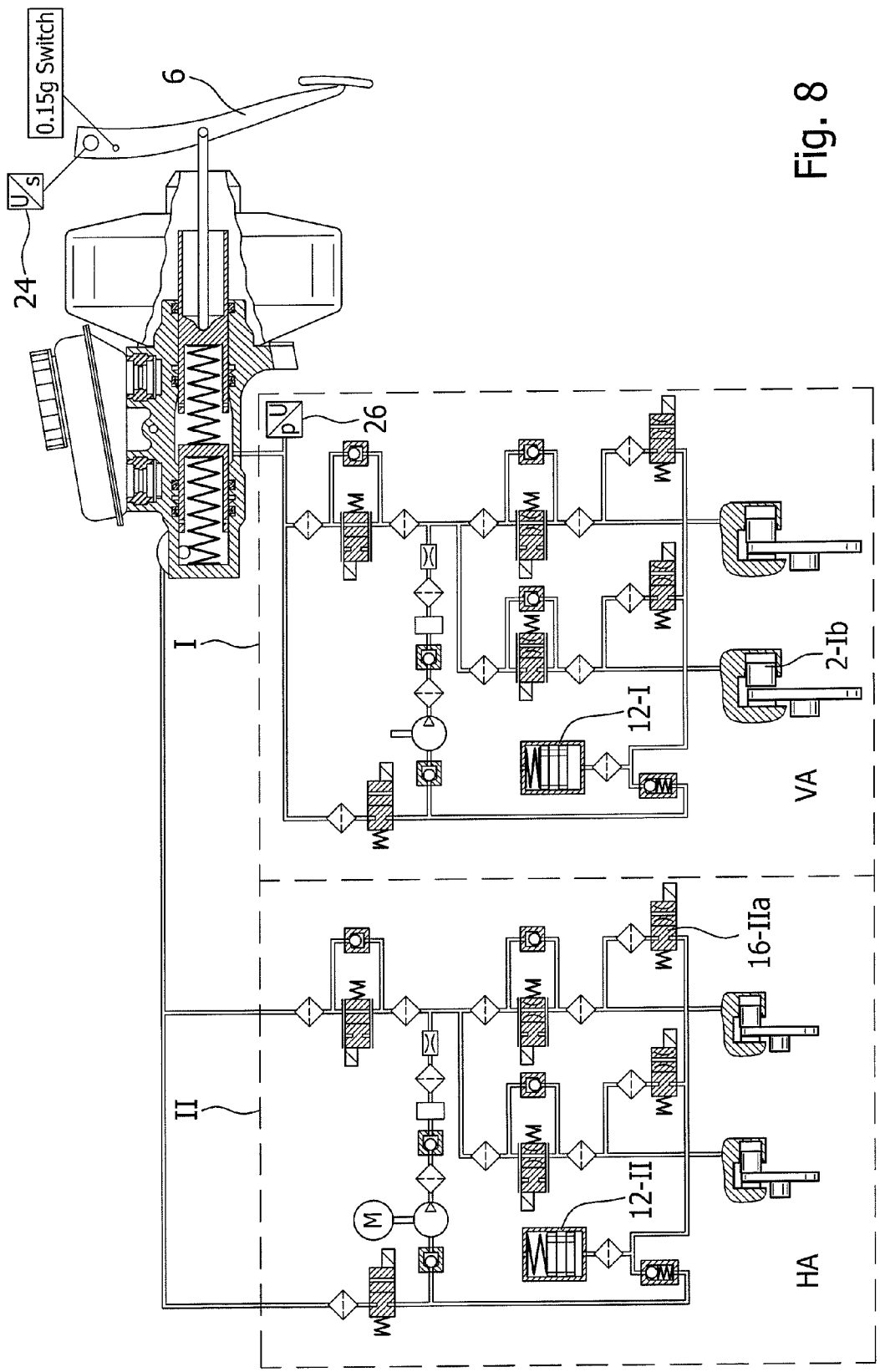

The pressure accumulator 12-II of brake circuit II is filled with pressure medium B until the maximum braking torque generated by the generator corresponds to the driver braking demand or begins to exceed the braking torque that can be delivered by the generator. The valve 16-IIa, which is closed when de-energized, is then closed again as illustrated in FIG. 8. "Normal" brake actuation (in the sense of a conventional hydraulic brake system) by the driver is now possible, that is to say no further pressure medium B is discharged into a pressure accumulator 12.

Figure 9:
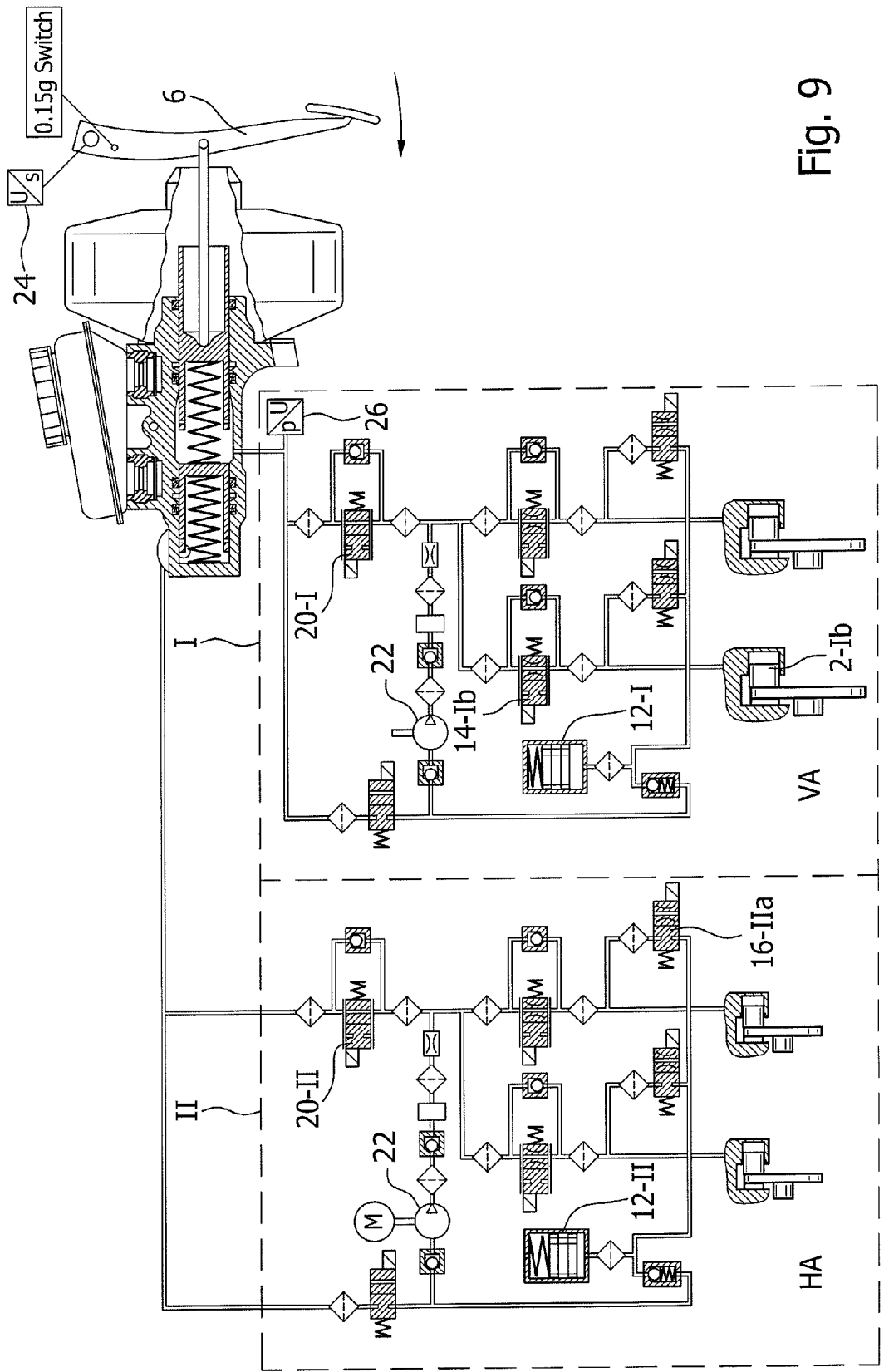

If the braking torque demanded by the driver further exceeds the braking torque that can be delivered by the generator, the valve 16-Ib, which is open when de-energized, of the isolated wheel brake 2-Ib is opened as illustrated in FIG. 9 in order to attain an increased braking action at said wheel brake 2-Ib.

A transfer (blending) from substantially regenerative braking of the vehicle to a combination of regenerative braking and friction braking or else to purely friction braking is necessary if the braking torque that can be delivered by the generator decreases as a function of the vehicle speed (also referred to as "ramp-out"), as a result of which the generator can deliver less braking torque than is demanded by the driver, such that the overall braking action must be supplemented by the friction brakes. The blending or "fading over" from regenerative braking to friction braking should be carried out with the least possible feedback to the brake pedal so as not to confuse the driver.

In principle, blending at the corresponding brake circuit could also be used as an alternative to an activation of the hitherto isolated wheel brake, wherein then, in order to perform a blending process, the valve 16-Ib, which is open when de-energized, is opened after the isolating valve 20-I has been closed.

FIGS. 9-13 schematically illustrate the individual steps of an activation of the hydraulic components during the execution of an exemplary method for blending.

Figure 10:
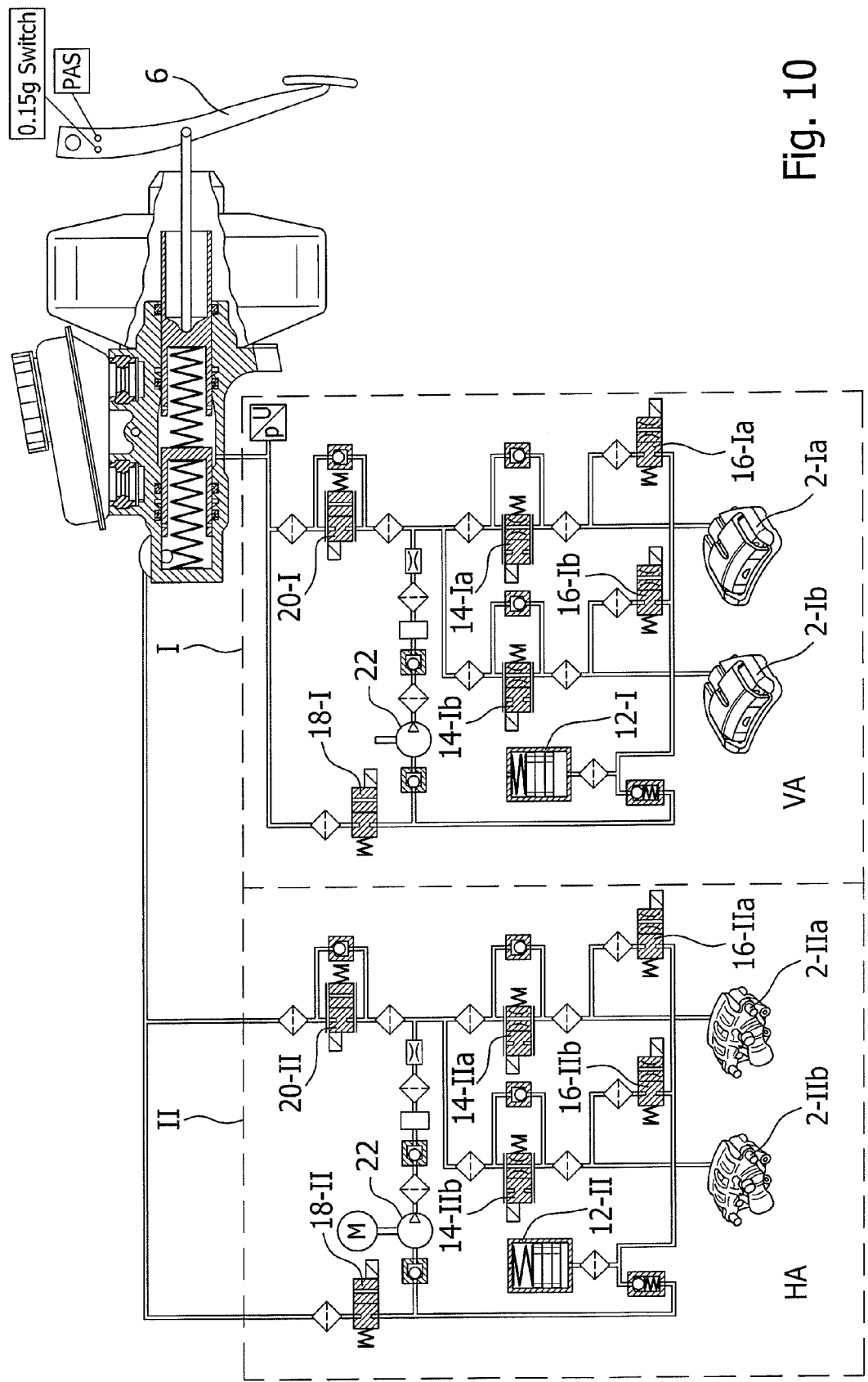
Figure 11:
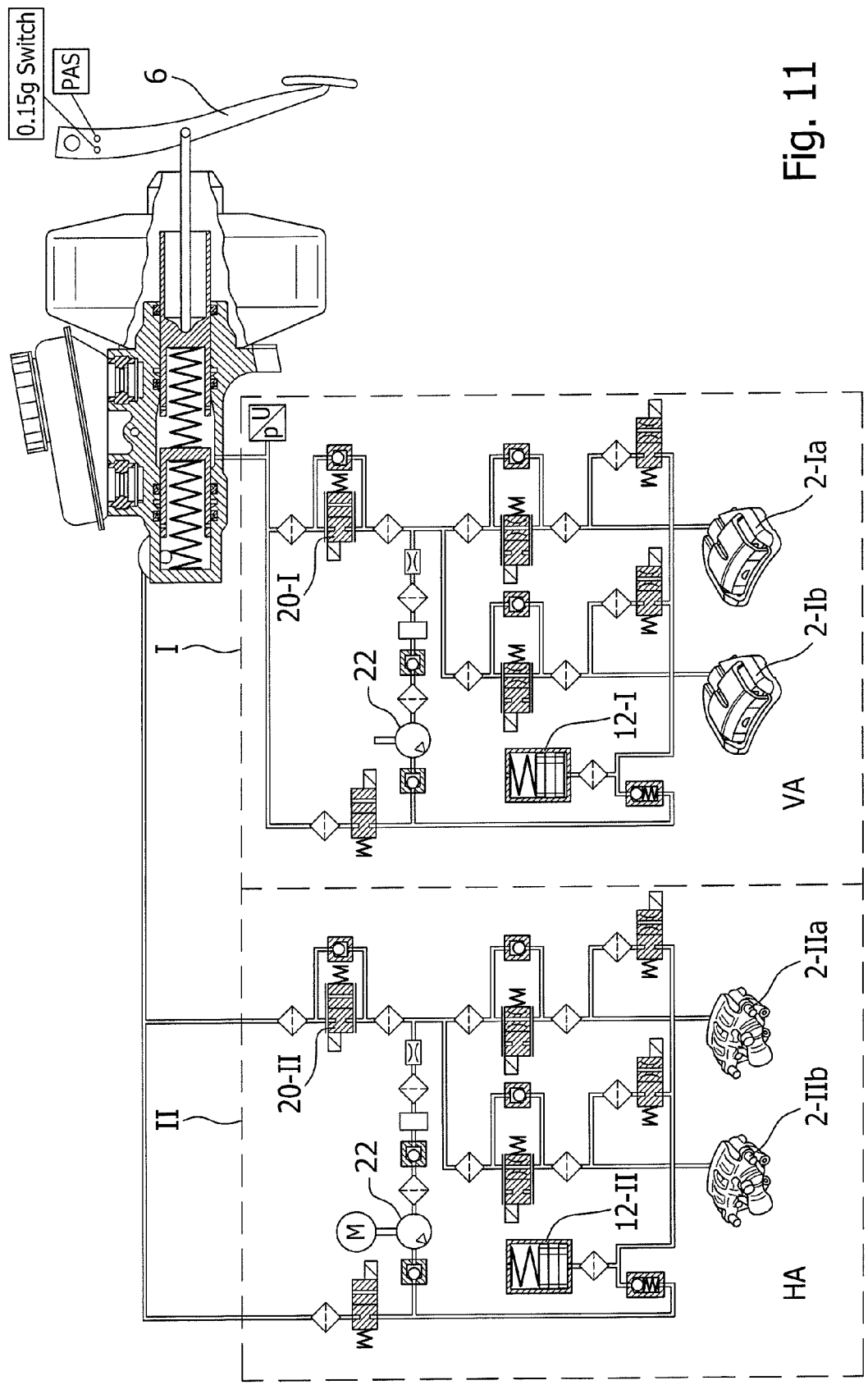

Proceeding, for example, from the state illustrated in FIG. 9, in which the valves are de-energized, the isolating valves 20-I, 20-II are closed as illustrated in FIG. 10 in order to prevent feedback to the brake pedal. The motor-pump assembly 22 is then activated such that pressure medium B is delivered from the pressure accumulators 12-I, 12-II into the wheel brakes 2 (FIG. 11) in order to obtain the desired overall braking torque. The excessively low or falling generator braking torque is thus supplemented by means of the friction brakes.

Figure 12:
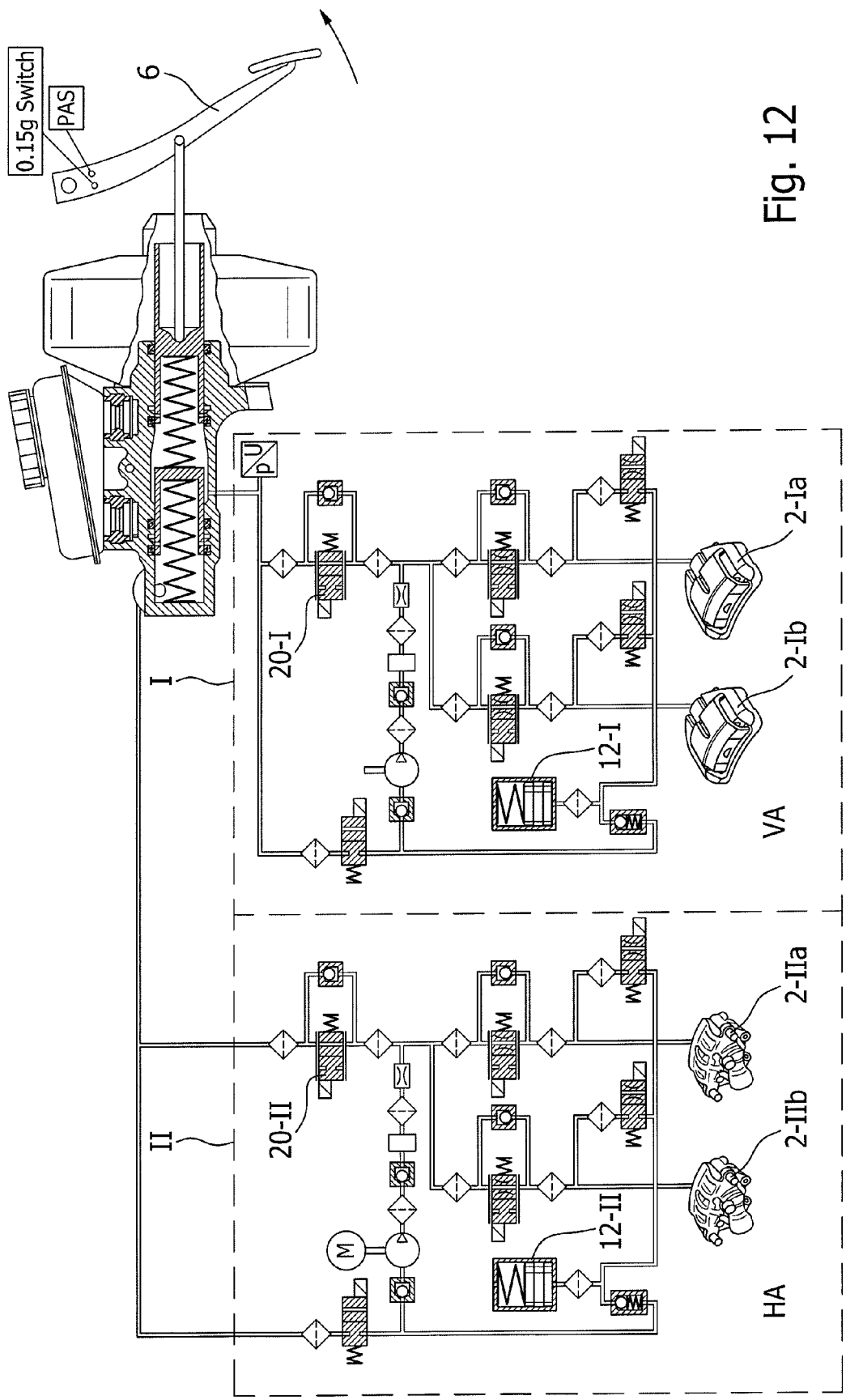
Figure 13:
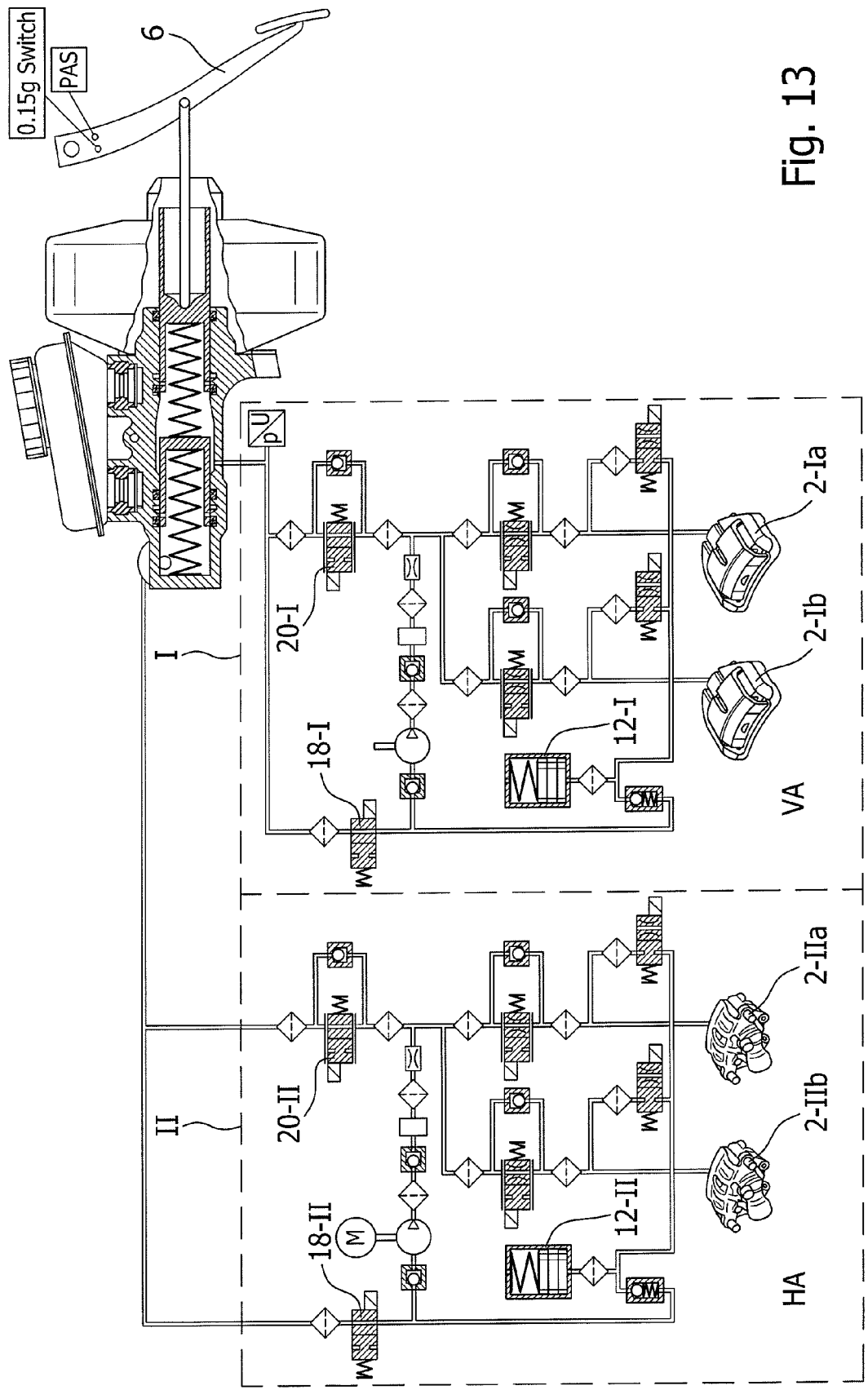

If the driver releases the brake pedal 6 and the demanded braking torque falls below the present overall braking torque, the blending is ended, that is to say the operation of the pump 22 is stopped. If the brake actuation decreases further, the isolating valves 20-I, 20-II are opened as shown in FIG. 12.

To completely empty the pressure accumulator 12 at the end of the method, the electronic switching valves 18-I, 18-II are opened, in particular multiple times and for a short time in each case.

If the braking process by the driver is ended without a blending process having been necessary, the pressure accumulators are emptied by opening the outlet valves. Complete emptying is subsequently ensured through multiple brief actuations of the electronic switching valves.

In an alternative preferred embodiment of the invention, the brake system comprises a second sensor element for detecting a brake pedal actuation, which second sensor element is independent of the brake pedal travel sensor or angle sensor 24. If the brake pedal actuation reaches a predefined value, said second sensor element is advantageously activated and ends in particular a filling process of a pressure accumulator (for example through the closure of the one or more valves 16, which are closed when de-energized). In this way, correct identification of the driver braking demand is ensured in the event that the signal of the brake pedal travel sensor 24 is erroneous, for example owing to mechanical damage of the sensor 24.

The activation threshold of the second sensor element should be configured for a degree of braking (degree of brake actuation) at which the generator no longer contributes, or scarcely contributes, to the braking action. The second sensor element should be mounted separately and have its own energy supply. The sensor element could be arranged on the piston of the thrust rod circuit of the master cylinder or on the brake pedal (similarly to a brake light switch element, albeit with an offset switching point as described above). In the exemplary brake system illustrated in FIGS. 4 to 13, the second sensor element is designed as a 0.15 g (g: gravitational acceleration) switching element which is arranged on the brake pedal 6.

The invention claimed is:

1. A method in which a brake system for a motor vehicle is at least one of controlled and regulated, said motor vehicle having at least one electrically regenerative brake and a hydraulic pressure-medium-operated brake system with friction brakes, wherein wheel brakes assigned to the individual wheels are arranged in at least two brake circuits which can be charged with pressure medium by a first brake pressure generating means, and wherein each brake circuit comprises at least one pressure accumulator and at least two electronically activatable hydraulic valves, such that during a braking process with the one or more electrically regenerative brakes, by activation of at least one hydraulic valve, at a point in time, the pressure medium is discharged only into one predetermined pressure accumulator,
   wherein inlet and outlet hydraulic valves of the wheel brakes, in the two brake circuits are activated such that firstly the pressure accumulator of a first one of the brake circuits and subsequently the pressure accumulator of a second one of the brake circuits is filled.

2. The method as claimed in claim 1, wherein the first brake pressure generating means is a tandem master brake cylinder.

3. The method as claimed in claim 1, wherein a filling of a pressure accumulator is carried out via the outlet valve of only one of the wheel brakes of the first brake circuit.

4. The method as claimed in claim 1, wherein one of the two wheel brakes of at least one brake circuit is charged with a predefined pressure medium volume, and said wheel brake is subsequently hydraulically isolated, through the closure of the associated inlet valve, from the first brake pressure generating means and from the associated pressure accumulator.

5. The method as claimed in claim 4, wherein the wheel brake is hydraulically isolated when a first predefined measure of an actuation of a brake actuation pedal is attained, the first predefined measure being detected by at least one of a pedal angle sensor and a switch.

6. The method as claimed in claim 5, wherein firstly a filling of a pressure accumulator is commenced via the outlet valve of one of the two wheel brakes, and a wheel brake of a first brake circuit is hydraulically isolated when the first predefined measure of the brake actuation is attained.

7. The method as claimed in claim 4, wherein the filling of the pressure accumulators is ended and the hydraulically isolated wheel brake is connected to the first brake pressure generating means again when a third predefined measure of an actuation of a brake actuation pedal is attained, wherein the third predefined measure is detected by a pedal angle sensor and corresponds to a predefined value of the braking torque provided by the electrically regenerative brake or brakes.

8. The method as claimed in claim 7, wherein the predefined value of the braking torque provided by the electrically regenerative brake or brakes is a predefined fraction of a maximum delivered braking torque of the electrically regenerative brake or brakes.

9. The method as claimed in claim 4, wherein the filling of the pressure accumulators is ended and the hydraulically isolated wheel brake is connected to the first brake pressure generating means again when the difference between the pressure measured at a position of the first brake circuit and the pressure measured at a position of the second brake circuit exceeds a predefined threshold value.

10. The method as claimed in claim 1, wherein if the braking torque delivered by the electrically regenerative brake or brakes is lower than the braking torque demanded by the driver, the first brake pressure generating means is hydraulically isolated from the wheel brakes through the closure of a hydraulic valve, and a brake medium is delivered from both pressure accumulators into the wheel brakes by a second brake pressure generating means.

11. The method as claimed in claim 10, wherein the second brake pressure generating means is a hydraulic pump.

12. A method in which a brake system for a motor vehicle is at least one of controlled and regulated, said motor vehicle having at least one electrically regenerative brake and a hydraulic pressure-medium-operated brake system with friction brakes, wherein wheel brakes assigned to the individual wheels are arranged in at least two brake circuits which can be charged with pressure medium by a first brake pressure generating means and wherein each brake circuit comprises at least one pressure accumulator and at least two electronically activatable hydraulic valves, such that during a braking process with the one or more electrically regenerative brakes, by activation of at least one hydraulic valve, at a point in time, the pressure medium is discharged only into one predetermined pressure accumulator,
   wherein one of the two wheel brakes of at least one brake circuit is charged with a predefined pressure medium volume, and said wheel brake is subsequently hydraulically isolated, through the closure of the associated inlet valve, from the first brake pressure generating means and from the associated pressure accumulator, and wherein the filling of one pressure accumulator is ended and the filling of the other pressure accumulator is commenced when a second predefined measure of an actuation of a brake actuation pedal is attained, wherein the second predefined measure is detected by a pedal angle sensor and corresponds to a predefined value of the braking torque provided by the electrically regenerative brake or brakes.

13. The method as claimed in claim 12, wherein the predefined value of the braking torque provided by the electrically regenerative brake or brakes is a predefined fraction of a maximum delivered braking torque of the electrically regenerative brake or brakes.

14. A method in which a brake system for a motor vehicle is at least one of controlled and regulated, said motor vehicle having at least one electrically regenerative brake and a hydraulic pressure-medium-operated brake system with friction brakes, wherein wheel brakes assigned to the individual wheels are arranged in at least two brake circuits which can be charged with pressure medium by a first brake pressure generating means, and wherein each brake circuit comprises at least one pressure accumulator and at least two electronically activatable hydraulic valves, such that during a braking process with the one or more electrically regenerative brakes, by activation of at least one hydraulic valve, at a point in time, the pressure medium is discharged only into one predetermined pressure accumulator, wherein the actuation of the hydraulic valves of a brake circuit takes place in an alternating fashion, such that during one braking process, a first inlet valve is closed and a first outlet valve is opened while a second inlet valve remains open and a second outlet valve remains closed, and in the subsequent braking process, the second inlet valve is closed and the second outlet valve is opened, while the first inlet valve and outlet valve are not actuated.

* * * * *